United States Patent [19]

Rivalto

[11] 4,124,013

[45] Nov. 7, 1978

[54] FUEL LEVEL RESPONSIVE MEANS

[76] Inventor: Michael A. Rivalto, 2089 Rolling Valley Dr., Germantown, Tenn. 38138

[21] Appl. No.: 811,187

[22] Filed: Jun. 29, 1977

[51] Int. Cl.² ............................................. F02B 77/08
[52] U.S. Cl. ...................... 123/198 DB; 123/139 AZ; 180/103 BF
[58] Field of Search .... 123/198 D, 198 DC, 198 DB, 123/198 R, 139 AZ; 180/84 R, 103 R, 103 BF

[56] References Cited

U.S. PATENT DOCUMENTS

| 2,096,291 | 10/1937 | Tanner | 123/198 DC |
|---|---|---|---|
| 2,162,174 | 6/1939 | Jones | 180/82 R X |
| 3,153,403 | 10/1964 | Dobbs | 123/198 DB X |
| 3,392,718 | 7/1968 | Saunders et al. | 123/198 D |
| 3,431,555 | 3/1969 | Leone | 180/82 R X |
| 3,499,130 | 3/1970 | Norred | 123/198 D X |
| 3,620,204 | 11/1971 | Baltadonis | 123/198 D |
| 3,763,836 | 10/1973 | Guehr | 123/198 D X |
| 3,832,982 | 9/1974 | Guehr | 123/198 D X |
| 3,853,110 | 12/1974 | Van der Merwe | 123/198 D X |

Primary Examiner—Ira S. Lazarus
Attorney, Agent, or Firm—John R. Walker

[57] ABSTRACT

A device for cutting off a diesel motor or the like when the fuel level in the fuel tank of the diesel motor drops below a predetermined level or height. An electric circuit is positioned between a source of electric power and an electrically operative device which, when activated, cuts off the motor. A switch is electrically coupled to the electric circuit and is adapted to close when the level of fuel in the fuel tank drops below a predetermined level to thereby activate the electrically operative device and cut off the motor.

10 Claims, 4 Drawing Figures

FUEL LEVEL RESPONSIVE MEANS

BACKGROUND OF THE INVENTION

1. Field of the Invention

This invention relates generally to internal combustion motors and more specifically to a safety device for use with such motors which prevents the motor from running when the level of fuel in the fuel tank of the motor has dropped below a predetermined level.

2. Description of the Prior Art

Heretofore, various savety devices have been developed for use with internal combustion motors to somehow give a warning that some feature of the motor has reached a stage that something need be done. For example, devices have been developed for giving a visual or audible warning when the fuel level of internal combustion motors becomes low. See Gregory, U.S. Pat. No. 1,712,665; Tobias, U.S. Pat. No. 2,756,410; Gondolfo, U.S. Pat. No. 2,867,698; and Meserow, U.S. Pat. No. 3,335,414. Other devices have been developed for giving a warning and/or shutting off internal combustion motors if the liquid coolant or lubricant thereof becomes too low to adequately cool or lubricate the motor. See Huckabee, U.S. Pat. No. 2,700,153; McGinty, U.S. Pat. No. 3,179,920; Ludewig et al, U.S. Pat. No. 3,841,291; and Luteran, U.S. Pat. No. 3,944,845. In addition, Palm, U.S. Pat. No. 2,766,439 and Edwards, U.S. Pat. No. 3,925,756, disclose devices for indicating, respectively, whether a refrigerating unit of the type for use with tractor-trailer trucks is performing properly, and whether the fuel level of an internal combustion motor is being unauthorizedly lowered. None of the above patents disclose or suggest the present invention.

A problem prevalent in all diesel motors is that of making sure the motor does not draw air into the fuel injectors thereof. This occurs mainly when the motor runs low on fuel. If air is drawn into the fuel injectors of a diesel motor, a complex and time consuming operation must be performed before the motor is ready to run again. That is, among other things, the injector pump must be opened and manually worked until diesel fuel flows therethrough without containing air bubbles. This operation usually takes between one and two hours. Also, when air is drawn into the fuel injectors of a diesel motor used to power a refrigeration unit such as typically used on many tractor-trailer trucks, the cargo often spoils before the diesel motor can be restarted. Various safety devices have been developed as heretofore discussed which give a visual or audible warning when the fuel level becomes low. However, such devices are disadvantageous because the warnings given often go unheeded for one reason or another.

SUMMARY OF THE INVENTION

The present invention is directed towards overcoming the problems and disadvantages of prior safety devices responsive to the level of fuel in a fuel tank of a diesel motor or the like. The concept of the present invention is to provide means which causes a motor to be cut off when the fuel level thereof drops below a predetermined height. The responsive means of the present invention is for use with a motor of the type including an electrically operative cut-off means for selectively cutting off the motor, and including a source of electric power. The responsive means of the present invention includes an electric circuit for electrically joining the cut-off means and the source of electric power; and includes a switch means electrically coupled to the electric circuit for being operatively coupled to the fuel tank of the motor and for closing when the level of fuel in the fuel tank drops below a predetermined height to thereby activate the cut-off means.

The objects of the present invention include providing means which cuts off or shuts down a motor when the level of fuel in the fuel tank which supplies fuel to the motor drops below a predetermined level so as to prevent:

(1) getting air into the fuel system, (2) running the battery of the motor down while trying to restart the motor, (3) knocking out the electric thermostat or the preheater of the motor with a 24-volt jump start, (4) shortening the life of the battery with quick charge starts, (5) shortening the life of the starter of the motor, and (6) lost time and cargo spoilage due to locating the problem, refueling and removing all air from the fuel system.

DESCRIPTION OF THE PREFERRED EMBODIMENT

Figure 1:
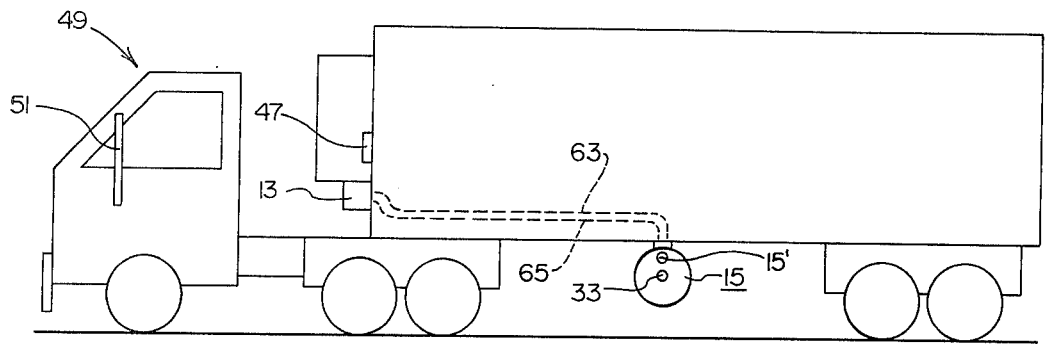
FIG. 1 is a side elevational view of a tractor-trailer truck showing the responsive means of the present invention attached thereto.
Figure 2:
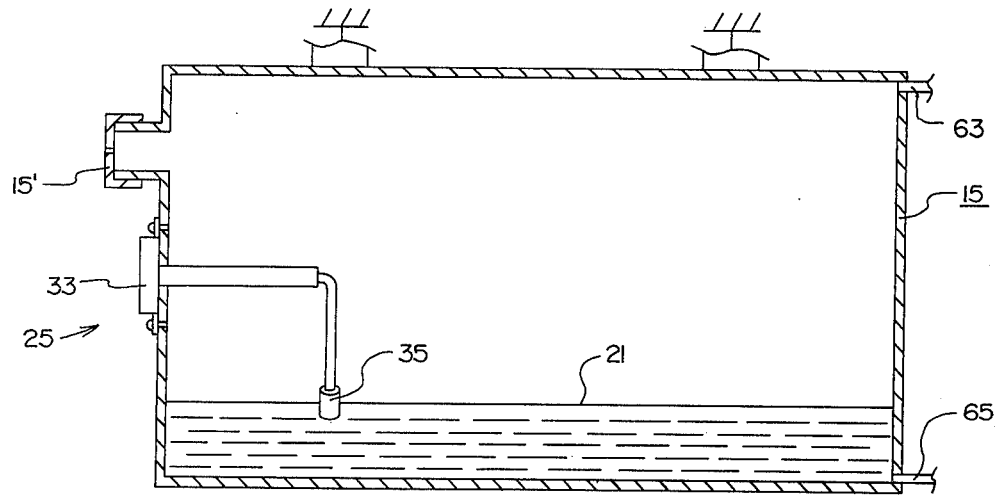
FIG. 2 is a sectional view of a fuel tank of a motor showing a portion of the responsive means of the present invention attached thereto.
Figure 3:
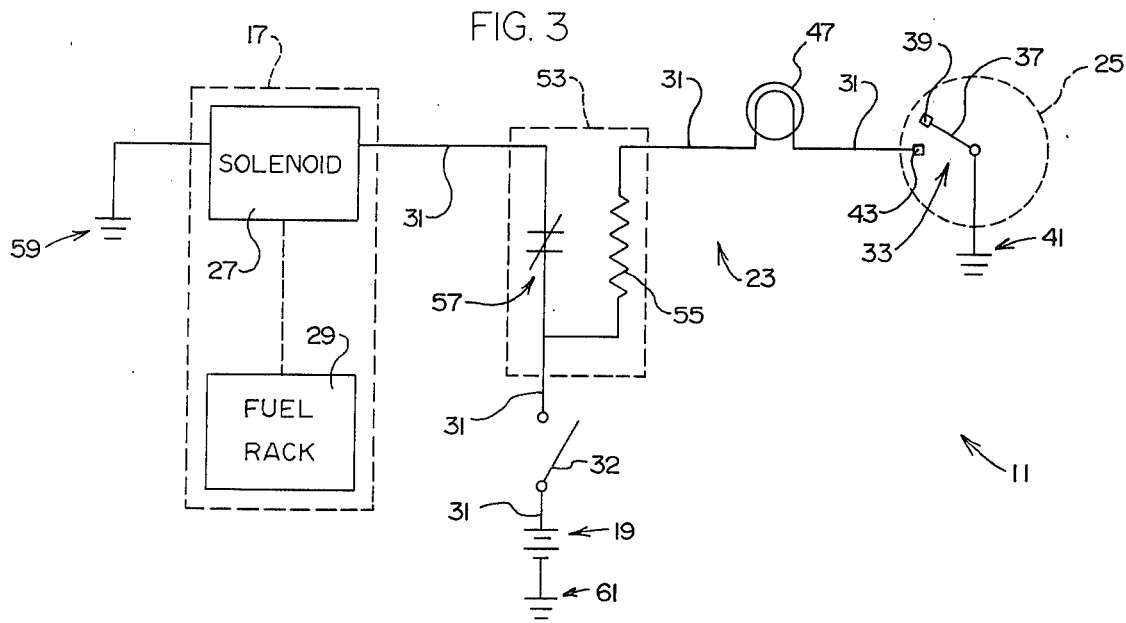
FIG. 3 is a schematic view of the responsive means of the present invention shown attached to portions of a motor.
Figure 4:
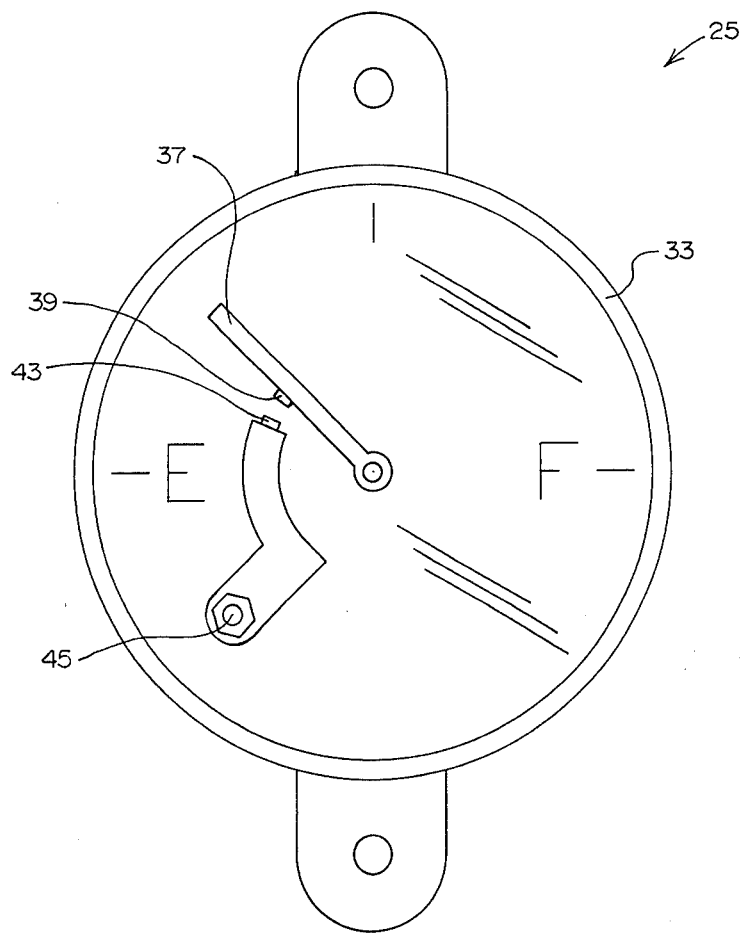
FIG. 4 is a front elevational view of the switch means of the responsive means of the present invention.

The responsive means 11 of the present invention (see, in general, FIG. 3) is for use with a motor 13 of the type including a fuel tank 15, an electrically operative cut-off means 17, and a source of electric power such as a battery 19 (see FIGS. 1, 2 and 3). The responsive means 11 of the present invention is especially adapted for use with a diesel motor 13 of the type used on diesel power refrigeration units of tractor-trailer trucks or the like. The means 11 is responsive to the level of fuel 21 in the fuel tank 15 so as to cause the motor 13 to shut off or cut off when the level of fuel 21 in the fuel tank 15 drops below a certain predetermined level. The responsive means 11 includes, in general, an electric circuit 23 for electrically joining the cut-off means 17 and the source 19 of electric power; and a switch means 25 electrically coupled to the electric circuit 23 for being operatively coupled to the fuel tank 15 of the motor 13 and for closing when the level of fuel 21 in the fuel tank 15 drops below a predetermined height to thereby activate the cut-off means 17 to cut off or shut down the motor 13.

The cut-off means 17 preferably consists of an electrically operative solenoid 57 and a fuel rack 29. The fuel rack 29 of a construction well known to those skilled in the art is a part of the motor 13 and is movable between a first position in which the motor 13 is allowed to operate and a second position in which the motor 13 is shut off in a manner as will be apparent to those skilled in the art. The solenoid 27 is operatively coupled to the fuel rack 29 in such a manner to move the fuel rack 29 from the first position to the second position when the solenoid 27 is activated (i.e., when electric power passes through the solenoid 27).

The electric circuit 23 includes an electric conductor 31 for extending between the source 19 of electric power and the the switch means 25 (see FIG. 3). The electric conductor 31 may consist of one or more lengths of standard electrically conductive wire coupled to the source 19 of electric power and the switch means 25 in a manner as will be apparent to those skilled in the art. A master switch 32 may be electrically coupled to the electric conductor 31 so as to allow the responsive means 11 to be manually and selectively set to activate or energize the solenoid 27 when the level of fuel 21 in the fuel tank 15 drops below a predetermined height or level.

The switch means 25 preferably includes a fuel level indicator 33 for indicating the level of fuel 21 in the fuel tank 15. The fuel level indicator 33 is adapted to close the switch means 25 when the level of fuel 21 in the fuel tank 15 drops below a predetermined height or level. That is, the fuel level indicator 33 preferably includes a float member 35 for being operatively communicated with the interior of the fuel tank 15 (see FIG. 2) and for resting substantially upon the surface of the fuel 21 within the fuel tank 15 to cause the switch means 25 to close when the level of fuel 21 in the fuel tank 15 drops below a predetermined level. More specifically, the fuel level indicator 33 may include a visual indicator such as a standard fuel gauge having a blade 37 operatively coupled to the float member 35 in any manner well known to those skilled in the art for moving in response to the float member 35 to thereby indicate the level of fuel 21 in the fuel tank 15. The blade 37 is preferably provided with an electrical contact 39 which is coupled to an electrical ground 41 (see FIG. 3) in any manner apparent to those skilled in the art. A second electrical contact 43 is preferably located so as to contact the first electrical contact 39 when the blade 37 is in a position indicating that the level of fuel 21 within the fuel tank 15 has dropped below a certain predetermined level such as ⅛ of a tank. The second electrical contact 43 is electrically coupled to the electric conductor 31 (see FIG. 3) in any manner apparent to those skilled in the art. For example, a screw 45 may be electrically attached to the electrical contact 43 and the electric conductor 31 may be, in turn, electrically attached to the screw 45. It should be noted that such gauges are commercially available from Rochester Gauges, Inc., of Dallas, Tex.

A light means 47 may be electrically coupled to the electric circuit 23 (see FIG. 3) for being activated when the switch means 25 closes to thereby give a visual warning that the level of fuel 21 in the fuel tank 15 has dropped below a predetermined height or level. The light means 47 may consist of a standard incandescent light and is preferably positioned on a tractor-trailer truck 49 or the like in such a manner that it is visible through the rear view mirror 51 of the truck 49 (see FIG. 1).

The responsive means 11 may include a time delay means 53 (see FIG. 3) for delaying the activation of the cut-off means 17 until the switch means 25 has been closed for a predetermined period of time. The time delay means 53 is preferably electrically coupled to the electric circuit 23 between the source 19 of electric power and the cut-off means 17 (see FIG. 3). The time delay means 53 may consist of any well known time delay means which will delay the closing of a circuit between the source 19 of electric power and the solenoid 26 of the cut-off means 17 for a pre-determined period of time after the switch means 25 has closed. For example, the time delay means 53 may include a resistor element 55 positioned in the electric circuit 23 between the source 19 of electric power and the switch means 25 for giving off heat, when the switch means 25 is closed, and may include a heat sensitive switch element 57 mounted in the electric circuit 23 between the source 19 of electric power and the solenoid 27 and adapted to close after the resistor element 55 gives off heat for predetermined length of time such as 1 minute. The heat sensitive switch element 57 is preferably of the manual reset type so that once it has closed, it must manually be reopened. It should be noted that such a time delay means is commercially available from Cutler-Hammer of Milwaukee, Wis., as Model No. 10-1015-5.

The operation of the responsive means 11 is quite simple. With the solenoid 27 and the source 19 of electric power, electrically coupled to electrical grounds 59, 61 respectively, all that is necessary to activate the solenoid 27 to move the fuel rack 29 to a position whereby the motor 13 is shut down or cut off is to close the electric circuit 23 between the source 19 of electric power and the solenoid 27. The electric circuit 23 will be so closed when the master switch 32 is closed and when the switch means 25 is closed for a predetermined length of time such as one minute so as to cause the resistor element 55 to give off sufficient heat to close the heat sensitive switch element 57. It should be noted that the time delay means 53 prevents the motor 13 from being cut off when the switch means 25 is momentarily closed due to movement of the fuel 21 in the fuel tank 15. However, it should be noted that when the level of fuel 21 in the fuel tank 15 is at a level that the normal movement or sloshing of the fuel 21 in the fuel tank 15 due to movement of the truck 49 down a road or the like will cause the float 35 to momentarily close the switch means 25, the light means 47 will flash on and off to give a visual warning that the fuel 21 in the fuel tank 15 is approaching the level where the motor 13 will be cut off. It should also be noted that when the motor 13 is a diesel motor, the normal return of fuel to the fuel tank 15 through the fuel return line 63 will coact with the normal exit of fuel 21 from the fuel tank 15 through the fuel pick-up line 65 and the normal entrance of air into the tank 15 through the typical vented cap 15' to cause the level of fuel 21 in the fuel tank 15 to move even when the truck 49 is at rest so as to cause the switch means 25 to be momentarily closed when the level of fuel 21 in the fuel tank 15 approaches the level at which the motor 13 will be cut off to thereby cause the light means 47 to flash on and off to give a visual warning thereof.

Although the invention has been described and illustrated with respect to a preferred embodiment thereof, it is not to be so limited since changes and modifications may be made therein which are within the full intended scope of the invention.

I claim:

1. Means responsive to the level of fuel in a fuel tank of a motor of the type including an electrically operative cut-off means for selectively cutting off said motor and including a source of electric power, said responsive means comprising:

(a) an electric circuit for electrically joining said cut-off means and said source of electric power; and (b) switch means electrically coupled to said electric circuit for being operatively coupled to said fuel tank of said motor and for closing when the level of fuel in said fuel tank drops below a predetermined height to thereby activate said cut-off means.

2. The responsive means of claim 1 in which is included a light means electrically coupled to said electric circuit for being activated when said switch means closes to give a visual warning that the level of fuel in said fuel tank has dropped below a predetermined height.

3. The responsive means of claim 1 in which said switch means includes a fuel level indicator for indicating the level of fuel in said fuel tank, said fuel level indicator being adapted to close said switch means when the level of fuel in said fuel tank drops below a predetermined height.

4. The responsive means of claim 3 in which said fuel level indicator includes a float member for being operatively communicated with the interior of said fuel tank and for resetting substantially upon the surface of the fuel within said fuel tank.

5. The responsive means of claim 1 in which is included time delay means for delaying the activation of said cut-off means until said switch means has been closed for a predetermined period of time.

6. An improved diesel motor of the type having a fuel tank, an electrically operable cut-off means for selectively cutting off said diesel motor and a source of electric power, wherein said improvement comprises:

(a) an electric circuit for being operatively coupled to said source of electric power and to said cut-off means; and (b) switch means electrically coupled to said electric circuit for being operatively coupled to said fuel tank and for closing when the level of fuel in said fuel tank drops below a predetermined level to thereby activate said cut-off means.

7. The improvement of claim 6 in which said improvement includes a light means electrically coupled to said electric circuit for being activated when said switch means closes to give a visual warning that the level of fuel in said fuel tank has dropped below a predetermined level.

8. The improvement of claim 6 in which said switch means includes a fuel level indicator for indicating the level of fuel in said fuel tank, said fuel level indicator being adapted to close said switch means when the level of fuel in said fuel tank drops below a predetermined level.

9. The improvement of claim 8 in which said fuel level indicator includes a float member for being operatively communicated with the indicator of said fuel tank and for resting substantially upon the surface of the fuel within said fuel tank.

10. The improvement of claim 6 in which is included time delay means for delaying the activation of said cut-off means until said switch means has been closed for a predetermined period of time.

* * * * *